Sept. 1, 1936. J. A. DIENNER ET AL Re. 20,087
MEANS FOR DEFROSTING COOLING ELEMENT OF MECHANICAL REFRIGERATORS
Original Filed Aug. 22, 1927
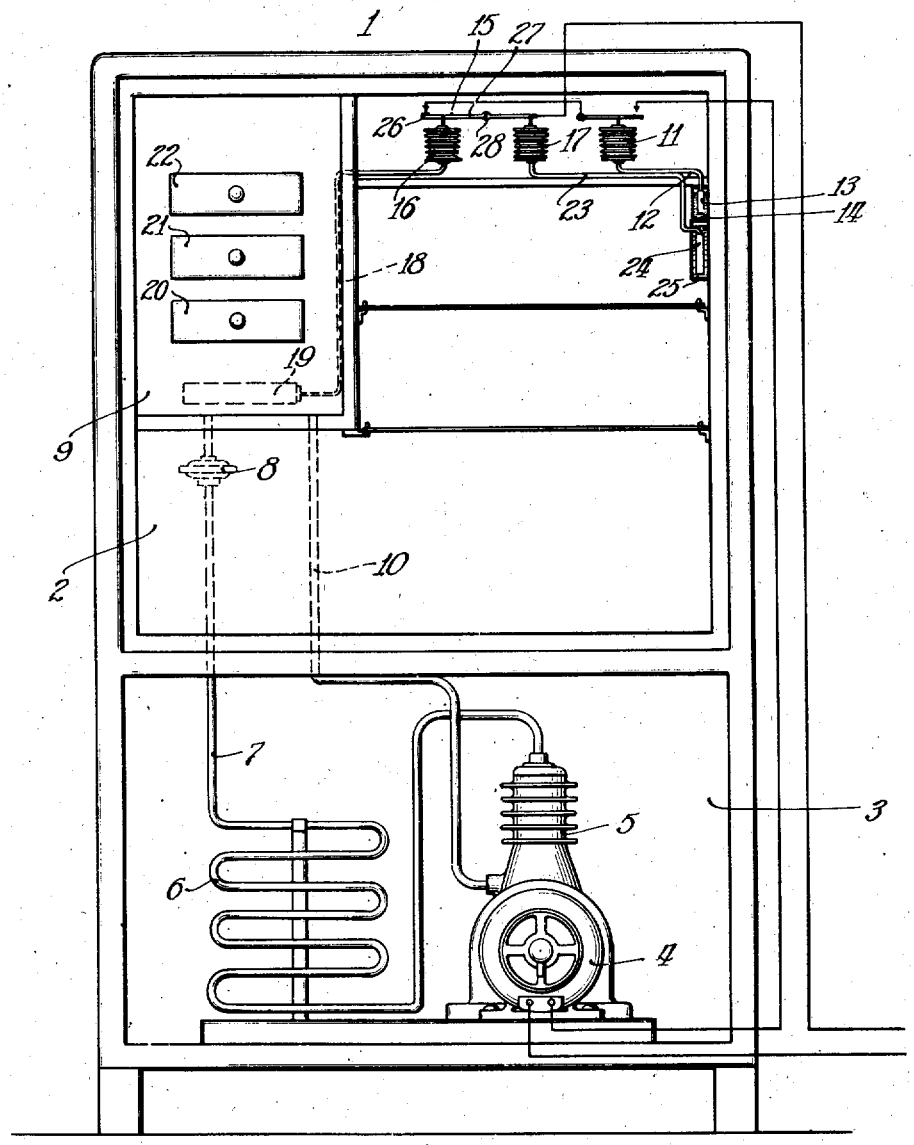
Inventors:
John A. Dienner
John E. Gardner
By Brown Boucher & Drenner
Attorneys.

Reissued Sept. 1, 1936

Re. 20,087

UNITED STATES PATENT OFFICE 20,087

MEANS FOR DEFROSTING COOLING ELEMENT OF MECHANICAL REFRIGERATORS

John A. Dienner, Evanston, and John E. Gardner, Chicago, Ill., assignors to Richard Ford, Detroit, Mich.

Original No. 1,942,412, dated January 9, 1934, Serial No. 214,490, August 22, 1927. Application for reissue January 7, 1935, Serial No. 738

24 Claims. (Cl. 62—4)

Our invention relates in general to mechanical refrigerators and more particularly to means for defrosting the cooling element of such refrigerators.

In mechanical refrigerators it has always been a great problem to prevent frosting as much as possible in order to maintain the operating efficiency of the device. When frost collects on the cooling element of a mechanical refrigerator, as it does very quickly from the moisture in the air, an insulating coating of ice is formed over the cooling element. This coating of insulation on the cooling element of the refrigerator means that mechanical equipment, whereby the refrigerating action is brought about, must necessarily operate a great deal oftener and longer in order to maintain the refrigerator at its desired temperature. In addition this insulating coating of ice increases day by day and finally renders it very difficult to get at the cooling element at all in order to remove the ice drawers, that are usually provided within the cooling element. In order to remove these drawers it is necessary to take a sharp instrument and chip away the ice, taking great care not to pierce the metal of the cooling element. When this condition prevails it is necessary that the operator or home owner having the refrigerator shut it down manually so that it will no longer respond to the thermostatic control device in the refrigerator. The low temperature of the refrigerator is then maintained by the melting of the frost or insulating ice coating. After this coating has melted entirely away it is again necessary to manually reconnect the mechanical refrigerating apparatus. Under this procedure, there is great danger of the home owner forgetting to reconnect the refrigerator at the proper time, or being unable to do so. Under these conditions the refrigerating compartment of the refrigerator is not maintained at its proper temperature and the food that it is desired to preserve within the device is very likely to be spoiled.

The principal object of our invention is to overcome all the above difficulties by providing means for automatically bringing about this defrosting operation which needs no attention from the refrigerator operator or home owner whatsoever.

Another object of our invention is to provide means responsive to the formation of an insulating ice coating about the cooling element.

Another object is to provide means controlled by this device which is responsive to the frosting of the cooling element for disabling the refrigerating apparatus.

Another object is to provide means responsive to the removal of the ice or insulating coating for automatically rendering the mechanical refrigerating mechanism again operable.

There are other objects of our invention, which together with the foregoing, will be described in the detailed specification which is to follow taken in conjunction with the accompanying drawing.

In practicing our invention we provide a thermal element which is responsive directly to the temperature of the refrigerating or cooling element and we also provide a thermal element which is responsive to the temperature of the refrigerating cabinet proper. Means are provided for automatically opening the circuit of the motor controlling the electric compressor, where such compressor is used to provide the refrigeration, when the temperature within the cooling device proper is below the temperature of the refrigerator. A thermally controlled switch is also employed for automatically operating the refrigerating mechanism under normal conditions, but its operation is without effect if an insulating frosting is present on the outside of the cooling element for the reasons above stated.

While in the drawing we have shown our invention applied to an electric type of refrigerator, it will be understood from the drawing and description how the same principle may be employed in any mechanical refrigerator to perform the same functions.

It will be appreciated that while we have shown a more or less diagrammatic view of the various elements of an electric mechanical refrigerator that they may be of any well known or suitable type.

In the drawing, we have shown a sectional view of an electric mechanical refrigerator with certain of the elements in side elevation.

Referring to the drawing, the reference character 1 designates any usual type of refrigerator box provided with a refrigerating compartment 2 and a compartment 3 containing the mechanism. This mechanism may be of any suitable or well known type and comprises essentially an electric motor 4 driving a compressor 5. The refrigerating fluid is transmitted from the compressor 5 to the cooling or condensing coil 6 through the pipe 7 and the expansion valve 8 through the cooling coils, (not shown) in the brine tank 9, and thence back to the compressor through the pipe 10. The condensing coil 6 may be cooled in any suitable or well known manner.

In fact, all the apparatus just described is of any suitable or well known type. The circuit of the electric motor 4 is controlled by a fluid controlled thermostatic snap switch 11 of any usual or well known construction. The thermostat 11 is operated through the medium of a fluid in the pipe 12 which is provided with a thermoresponsive portion 13, which is suitably immersed in a small brine tank 14. The reason for this provision, whereby the thermoresponsive element 13 controlling the fluid which operates the thermostat 11 is immersed in a small brine tank, is to render its action somewhat sluggish so that momentary opening of the door leading to the refrigerating compartment 2 of the refrigerator 1 will not bring about intermittent operation of the electric motor 4 and the compressor unit 5.

The circuit of the electric motor is also controlled by a snap switch 15, which may be of any well known or suitable construction. This snap switch is controlled by two bellows 16 and 17. The bellows 16 is controlled through the medium of a fluid acting in the pipe 18 from the thermoresponsive element 19 immersed in the brine tank 9 adjacent to the regular cooling coils of the refrigerator. The bellows 16 controlling the action of the snap switch 15 is thus directly responsive to the temperature maintained by the cooling coils within the brine tank, which is unaffected by the coating of frost or insulating ice that forms about the outside of the brine tank under and around the drawers 20, 21 and 22, for example, associated with the brine tank under usual operating conditions.

The snap switch 15 is also controlled by a bellows 17 which is operated by a fluid acting in the pipe 23. This fluid is controlled by the thermal element 24 which is immersed in a small brine tank 25 in the same manner that the element 13 is immersed in a small brine tank 14 and for the same reasons. Obviously these two brine tanks may be combined. The bellows 17 is thus controlled and is directly responsive to the temperature maintained in the refrigerating compartment 2 of the refrigerator. The snap switch 15 which is adapted to be operated by the conjoint action of the bellows 16 and 17 is adapted to open its contacts 26 when the temperature of the brine solution is a predetermined amount below the temperature of the refrigerating compartment of the refrigerator. This is indicated diagrammatically in the drawing where a contraction of the fluid in the bellows 16 causes the movement of the element 27 about its pivot 28 in a downward direction, while a rise in temperature in the refrigerating compartment tends to expand the bellows 17, thereby bringing about the opening movement of the contact making member 26.

So long as the proper temperature differential is maintained between the brine tank 9 and the thermal element 24 the action of the bellows 16 and 17 counterbalance each other and the operation of the refrigerator is directly controlled by the thermostat switch 11 in any usual or well known manner. That is, so long as there is no appreciable coating of frost or ice on the outside of the brine tank, the action of the refrigerator proceeds in any usual or well known manner under the control of the thermostat switch 11, so that the proper temperature is maintained within the refrigerating compartment 2. However, as soon as there is a thick enough insulating coating of frost or ice on the outside of the brine tank, the ready transfer of heat from the refrigerating compartment to the cooling element in the brine tank 9 is retarded and inhibited. The mechanical refrigerating equipment comprising the motor 4 and the compressor 5 is thus maintained in operation to still further reduce the temperature of the brine tank in an attempt to reduce the temperature within the refrigerating compartment the requisite amount. This brings about a differential action between the bellows 16 and the bellows 17 controlling the thermostat switch 15. When a predetermined differential is reached the contact making member 26 of the thermostat switch 15 is moved away from its associated contact member and the circuit of the compressor and the motor is permanently opened irrespective of the position of the thermostatic switch 11, controlling the normal operation of the refrigerator. The temperature within the refrigerating compartment 2 of the refrigerator is then maintained by the melting of the coating of ice or frost on the brine tank, since the mechanical refrigerating equipment can no longer be operated. When the ice and frost is melted away the temperature of the brine tank rises and the bellows 16 expands. Under these conditions there is no longer a differential in temperature between the brine tank 9 and the refrigerating compartment 2 and there is no differential between the bellows 16 and the bellows 17, consequently the contact making member 26 is brought into engagement with its associated contact member and the circuit of the thermostat switch 11 and the operation of the refrigerating system proceeds as before. The water formed by the melting of the ice and frost about the brine tank may be carried away by a suitable pan or in any other approved or well known manner. The predetermined differential in temperature governing the operation of the bellows 16 and 17 controlling the snap switch 15 may be brought about by the adjustment of the follow-through of the contact member associated with the contact making member 26.

The operation of the refrigerator now proceeds, as before, under the control of the thermostatic snap switch 11 until another insulating coating of frost or ice, sufficient to bring about the required temperature differential is formed, when the same operations are repeated.

From the foregoing, it will be seen that we have provided means for automatically bringing about the defrosting of the cooling element of a mechanical refrigerator. By our invention the frost or ice is caused to melt to remove the insulating coating and to permit the ice drawers 20, 21 and 22 to become readily accessible. In addition, our invention provides means for preventing the unnecessary movement of the mechanical refrigerating equipment with its consequent wear and tear on the apparatus in addition to the usual use of power in a vain attempt to maintain the required temperature within the refrigerating compartment. Also, our invention provides means for automatically initiating the operation of the mechanical refrigerating equipment as soon as the frost or ice condition is removed so as to continuously maintain the temperature within the refrigerating compartment at the proper degree.

It will be understood that the differential control element 15 comprising the interacting bellows 16 and 17 may be also employed to control a valve governing a gas operated refrigerator or, in fact, any type of mechanical refrigerator in a manner that will be obvious from the foregoing description.

While we have shown and described one embodiment of our invention, we are aware that many changes, modifications and deviations may be made, as it will be understood that we desire to protect by Letters Patent all such changes, modifications, deviations as come within the scope of the appended claims.

We claim:

1. In a refrigerator, a refrigerating compartment and a cooling element associated with said compartment, mechanically operated means for lowering the temperature of said cooling element, a thermal responsive device responsive to the temperature of said cooling element, and a thermal responsive device responsive to the temperature of said compartment, and means for controlling said mechanical means in accordance with the temperature differential between said thermal responsive devices.

2. A refrigerator comprising the combination of means providing a refrigerating compartment, a cooling element within the compartment, means for driving a fluid therethrough, and temperature responsive means operative whenever the difference between the temperature of the cooling element and the temperature in the refrigerating compartment reaches a predetermined value for stopping the fluid driving means.

3. A refrigerator comprising the combination of a refrigerating compartment, cooling means to cool said compartment, mechanical means to lower the temperature of said cooling means, and means to automatically control the mechanical means in accordance with the difference of temperature between the compartment and the cooling means.

4. A refrigerator comprising the combination of a refrigerating compartment, cooling means to cool said compartment, mechanical means to lower the temperature of said cooling means, means to automatically control the mechanical means in accordance with the difference of temperature between the compartment and the cooling means, and means acting serially with said automatic means to control the mechanical means in accordance with the temperature of said compartment.

5. In combination, a cooling chamber having a fluid expansion member for extracting heat from said chamber, a compressor for compressing fluid for said member, and thermally controlled means subject to the difference in temperature between the chamber and the member for preventing the operation of said compressor.

6. In combination, a cooling chamber having a fluid expansion cooled device for extracting heat from said chamber, means for compressing fluid for expansion to cool said device thermally controlled means subject to the difference in temperature between the chamber and the device for preventing the operation of said means, and thermally actuated means for controlling the temperature in said chamber.

7. In combination, a fluid containing chamber, a heat exchange device for absorbing heat from the fluid in the chamber, means for passing a cooling fluid through the heat exchange device to carry heat away from said device, a control device for said last named means and means responsive to a difference in temperature between the fluid in the chamber and the heat exchange device for actuating said control device.

8. In combination, a refrigerating chamber, a mechanical refrigerating system comprising a heat exchange device for cooling the chamber, an electric motor for operating the system, thermally controlled means for stopping and starting the motor in response to absolute temperature in the chamber, said last named means including a switch in the circuit of the motor, and thermally controlled means having a part in heat conducting relation to the heat exchange device and a part in heat conducting relation to the air in the cooling chamber for interrupting the circuit of the motor, said last named means comprising a switch in series relation to the aforesaid switch.

9. In combination, a cooling chamber, a heat exchange device for extracting heat from said chamber, a motor for operating said device, a thermally actuated switch in said chamber for controlling said motor, and means disposed in said chamber away from said switch for retarding the action of said switch.

10. In combination, a cooling chamber, a heat exchange device for extracting heat from said chamber, a motor for controlling said device, thermally actuated means responsive to the temperature in said chamber for actuating said motor, secondary means responsive to the difference in temperature of said chamber and said device for actuating said motor independently of said first named actuating means, and means in said chamber for retarding the action of said thermally actuated means.

11. In combination, a cooling chamber, fluid heat exchange means for extracting heat from said chamber, means for controlling the flow of fluid through said heat exchange means, differential thermally actuated means responsive to the temperatures of said heat exchange means and of said chamber for rendering said fluid flow controlling means inoperative, and means in said chamber for retarding the action of said thermally actuated means.

12. In combination, a refrigerating system including a cooling chamber and a heat exchange device, means responsive to the temperature of said chamber for controlling the operation of said system, differential means serially connected with said responsive means for maintaining a predetermined temperature difference between said cooling chamber and said heat exchange device, and means in said chamber for retarding the action of said responsive means.

13. In combination, a cooling chamber, a heat exchange device for extracting heat therefrom, differential means responsive to the temperature in said chamber and in said heat exchange device for maintaining a predetermined temperature relation therebetween, and means responsive to the temperature in said chamber for maintaining a predetermined temperature in said chamber, said differential means and said last named means being connected in series relation.

14. In combination, a cooling chamber, a heat exchange device for extracting heat therefrom, differential control means responsive to the temperatures of said chamber and said heat exchange device for maintaining a predetermined temperature relation therebetween, and thermally sensitive means responsive to the absolute temperature in said chamber for controlling the temperature in said chamber.

15. In combination, a cooling chamber, a heat exchange device for extracting heat therefrom, differential control means responsive to the temperatures of said chamber and said heat exchange device for maintaining a predetermined temperature relation therebetween, thermally sensitive means responsive to the absolute temperature in said chamber for controlling the temperature in said chamber, and means for retarding the action of said thermally sensitive means.

16. In combination, a pair of chambers, means for extracting heat from said chambers, means responsive to the temperature in each of said chambers for differentially controlling said heat extracting means to maintain a predetermined temperature difference between said chambers, and means responsive only to the temperature in one of said chambers for controlling the absolute temperature in said chamber.

17. The method of defrosting the heat extracting device of a refrigerating system employing a heat dissipating device and a heat extracting device which consists in normally controlling the refrigerating system by starting and stopping the dissipation of heat by the heat dissipator, and without reference to said normal control stopping the dissipation of heat by said heat dissipating device in response to an accumulation of frost on said heat absorbing device, and starting the dissipation of heat by said heat dissipation device only in response to a rise in temperature of the heat extracting device to a point above the freezing point of water.

18. A refrigerating system comprising in combination a heat extracting device which is subject to moisture-laden atmosphere, and a heat dissipating device operatively connected with said extracting device, thermally responsive means for normally stopping and starting the heat dissipating device, said extracting device being operated at a temperature at which frost accumulates thereupon, and means responsive to accumulation of frost on the evaporator for rendering the heat dissipating device ineffective, said last named means being responsive to a temperature condition of the heat extracting device above 32° F. for restoring the system to the control of said normally controlling thermally responsive means.

19. In a refrigerator controlling and defrosting system, having a heat extracting device subject to moisture-laden air, a heat dissipating device, an electric circuit for controlling the operation of said heat dissipating device, the combination of a pair of thermostats subject to the action of said extracting device for controlling said circuit to defrost the heat extracting device, one of said thermostats being in fixed heat conducting relation to the heat extracting device, and the heat conducting relation of the other one of said thermostats to the heat extracting device being subject to the formation of a coating of frost upon the surface of said heat extracting device, and means for controlling the absolute temperature of the refrigerated space between periods of defrosting.

20. The method of controlling defrosting of the heat extracting device of a refrigerating system, which is normally automatically controlled to maintain a predetermined mean temperature in a space to be refrigerated, and which system employs a heat dissipating device, and a heat extracting device operated thereby, which comprises normally stopping the heat dissipating device responsive to the attainment of a predetermined low temperature in the space to be refrigerated, and starting the heat dissipating device responsive to the attainment of a predetermined high temperature in said space, and independently of the temperature in said space stopping the heat dissipating device responsive to a predetermined decrease in heat extracting ability of said heat extracting device.

21. In combination, a cooling chamber, a heat extracting device for extracting heat from said chamber, a heat dissipating device for removing heat from said extracting device, normally controlling thermostatic means responsive to variations in absolute temperature in said chamber for stopping and starting said dissipating device, and thermostatic means responsive to changes in the thermal drop between said extracting device and the air in said chamber due to the accumulation of frost on the extracting device for rendering said heat extracting device ineffective.

22. In a refrigerator temperature controlling and defrosting system, a refrigerating chamber, a heat extracting device therefor, a heat dissipating device, automatic means controlling the normal cycle of rise and fall of temperature in said chamber by causing intermittent operation of said heat dissipating device to maintain a mean desired temperature, and automatic means governed by the formation of a coating of frost upon said heat extracting device for rendering said first automatic means ineffective.

23. Method of controlling the rate of heat extraction by a heat extracting device and a heat dissipating device from a refrigerator chamber, which comprises normally periodically operating the heat dissipating device in response to heat inflow to the chamber to reduce the temperature by flow of heat from the chamber to the heat extracting device until frost is deposited upon the heat extracting device, and in response to the diminution in the flow of heat from the chamber to the extracting device by said deposit of frost permitting the heat to accumulate by not extracting it until the deposit of frost has been melted thereby, and thereupon resuming the normal periodical operation of the dissipating device.

24. In a refrigerating system employing a heat extractor and a heat dissipator in which moisture from the air condenses and freezes on the heat extractor during the normal operation of the system, the method of defrosting the heat extractor which consists in initiating the start of a modified operation of the system in response to the accumulation of frost on the heat extractor so that the heat extractor increases in temperature and then causing resumption of normal operation of the system in response to a rise in temperature of the heat extractor to a point above the freezing point of water.

JOHN A. DIENNER.
JOHN E. GARDNER.